(12) United States Patent
D'Ercoli et al.

(10) Patent No.: US 10,581,712 B2
(45) Date of Patent: Mar. 3, 2020

(54) AUTOMATIC SHARED RESOURCE MANAGEMENT SYSTEM AND ASSOCIATED METHODS

(71) Applicant: Datalogic IP Tech S.R.L., Calderara di Reno, Bologna (IT)

(72) Inventors: Francesco D'Ercoli, Bologna (IT); Alessandro Brunetta, Padua (IT); Giorgio Sanzeni, Bologna (IT)

(73) Assignee: Datalogic IP Tech S.R.L., Calderara Di Reno (IT)

( * ) Notice: Subject to any disclaimer, the term of this patent is extended or adjusted under 35 U.S.C. 154(b) by 232 days.

(21) Appl. No.: 15/589,767

(22) Filed: May 8, 2017

(65) Prior Publication Data

US 2018/0324071 A1    Nov. 8, 2018

(51) Int. Cl.
  *H04L 12/26* (2006.01)
  *H04L 29/08* (2006.01)

(52) U.S. Cl.
  CPC ........ *H04L 43/0876* (2013.01); *H04L 67/327* (2013.01)

(58) Field of Classification Search
  CPC ............... H04L 43/0876; H04L 67/327; H04L 41/0896; H04L 41/142; H04L 67/12; H04L 67/32
  See application file for complete search history.

(56) References Cited

U.S. PATENT DOCUMENTS

| | | | |
|---|---|---|---|
| 5,446,737 A | 8/1995 | Cidon et al. | |
| 7,818,447 B1 | 10/2010 | Niver et al. | |
| 8,417,360 B2 | 4/2013 | Sustaeta et al. | |
| 9,423,848 B2 | 8/2016 | Keller et al. | |
| 2003/0061356 A1 | 3/2003 | Jason, Jr. | |
| 2005/0044202 A1 | 2/2005 | Shirota | |
| 2005/0239518 A1 | 10/2005 | D'Agostino et al. | |
| 2007/0130341 A1 | 6/2007 | Ma | |
| 2009/0113034 A1 | 4/2009 | Krishnappa et al. | |
| 2010/0262717 A1* | 10/2010 | Critchley | H04L 12/42 709/251 |
| 2011/0007669 A1* | 1/2011 | Yoon | H04L 45/026 370/255 |
| 2013/0142133 A1* | 6/2013 | Pedersen | H04W 16/10 370/329 |
| 2013/0176905 A1 | 7/2013 | Haverty | |
| 2014/0197964 A1 | 7/2014 | Idnani | |
| 2014/0237468 A1 | 8/2014 | Desai et al. | |
| 2015/0288577 A1 | 10/2015 | Clarke et al. | |
| 2016/0124411 A1 | 5/2016 | Tinnakornsrisuphap et al. | |

OTHER PUBLICATIONS

International Search Report and Written Opinion corresponding to PCT/US2018/031419, dated Jul. 20, 2018, 10 pages.

* cited by examiner

*Primary Examiner* — June Y Sison
(74) *Attorney, Agent, or Firm* — Dentons US LLP (57) ABSTRACT

A system and method for managing a shared resource in a network including a plurality of nodes including, in response to joining the network, broadcasting, by a node, an identification message to the network, and receiving, by the node, a token data structure including computational data including a threshold total resource consumption value of the plurality of nodes, current resource consumption values of respective nodes, and current utility function values of the respective nodes, the computational data being used by the node to adjust consumption of the shared resource by the node.

17 Claims, 11 Drawing Sheets

AUTOMATIC SHARED RESOURCE MANAGEMENT SYSTEM AND ASSOCIATED METHODS

FIELD OF THE INVENTION

The present invention relates to resource management, and more specifically, to peer-to-peer smart protocols used therefor.

BACKGROUND OF THE INVENTION

Computer Science is experimenting with new approaches to ubiquitous computing (UBICOMP), which includes adding intelligence not only in devices, but also to the environment. In the case of industrial automation, intelligence may be distributed in the network without delegating the intelligence to a server or to a human-machine interface.

As a specific example, imaging systems, such as 2D and 3D readers, are often connected in an industrial network as nodes on the network. In order to relieve processing constraints the main computing nodes and free more bandwidth on a network, available computing power in the network should be distributed. One current solution has been to place devices that routinely exchange high volumes of data close enough in the network so as to minimize cluttering communications across the entirety of the network.

In factory automation and shop floor fields, "energy management" is becoming a key topic due to new "green requirements" originally born in the building automation sector. Energy management can be thought as the proactive, organized, and systematic set up, monitoring, and measurement of energy consumption in order to meet some predefined requirement while taking into account environmental and economic objectives.

Concern over the global energy problem (availability and cost) as well as demands for greater environmental protection represent a challenge for devices that share resources in the near future. Distributed industrial auto-identification systems, such as vision systems, where a required power supply is not negligible and is strongly correlated to the performance of the system, present a unique problem.

BRIEF SUMMARY OF THE INVENTION

Shared resource consumption of a network of nodes, such as industrial equipment, may be managed using a logical token ring communication function that supports an operator setting a total resource threshold level and each of the nodes adjusting respective shared resource usage using game theory processing. The logical token ring communication function may include a token data structure inclusive of shared resource data being used by each of the nodes, thereby enabling each node to manage respective shared resources as compared to the total resource threshold level. By using a logical token ring communication function, the nodes of the network may manage the shared resources autonomously, and be able to accommodate nodes that are added or removed from the network.

One embodiment of a process for performing resource management may include managing a shared resource in a network including multiple nodes. In response to joining the network, an identification message may be broadcast by a node to the network. The node may receive a token data structure including computational data. The computational data may include a threshold total resource consumption value of the nodes, current resource consumption values of respective nodes, and current utility function values of the respective nodes. The computational data may be used by the node to adjust consumption of the shared resource by the node.

One embodiment of a node configured to manage a shared resource may include an input/output (I/O) unit and a processing unit in electronic communication with the I/O unit. The processing unit may be configured to broadcast an identification message inclusive of an address. A token data structure may be received, and consumption of the shared resource may be measured. Consumption of the shared resource may be adjusted.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

A network management process, as further described herein, may be configured to prevent, or at least contain within acceptable limits, consumption of a shared resource from exceeding a threshold without a need for action by a human operator or a central server arbitrage by utilizing a logical token ring approach of nodes (e.g., devices) on a network. The shared resource may be power consumption or communications bandwidth.

More specifically, the process may introduce game theory applications that can be applied to communications networks in order to address issues related to competition for shared and valuable resources. Utility functions may be a collaborative game play schema used in relation to consumption of shared resources in a communications network.

Although the principles described herein utilize a token ring concept, the use of token ring functionality or a modified token ring, as described as a logical ring herein, within a network enables nodes to modify resource consumption to limit or prevent total resource consumption by devices on a network from exceeding a threshold.

Figure 1A:
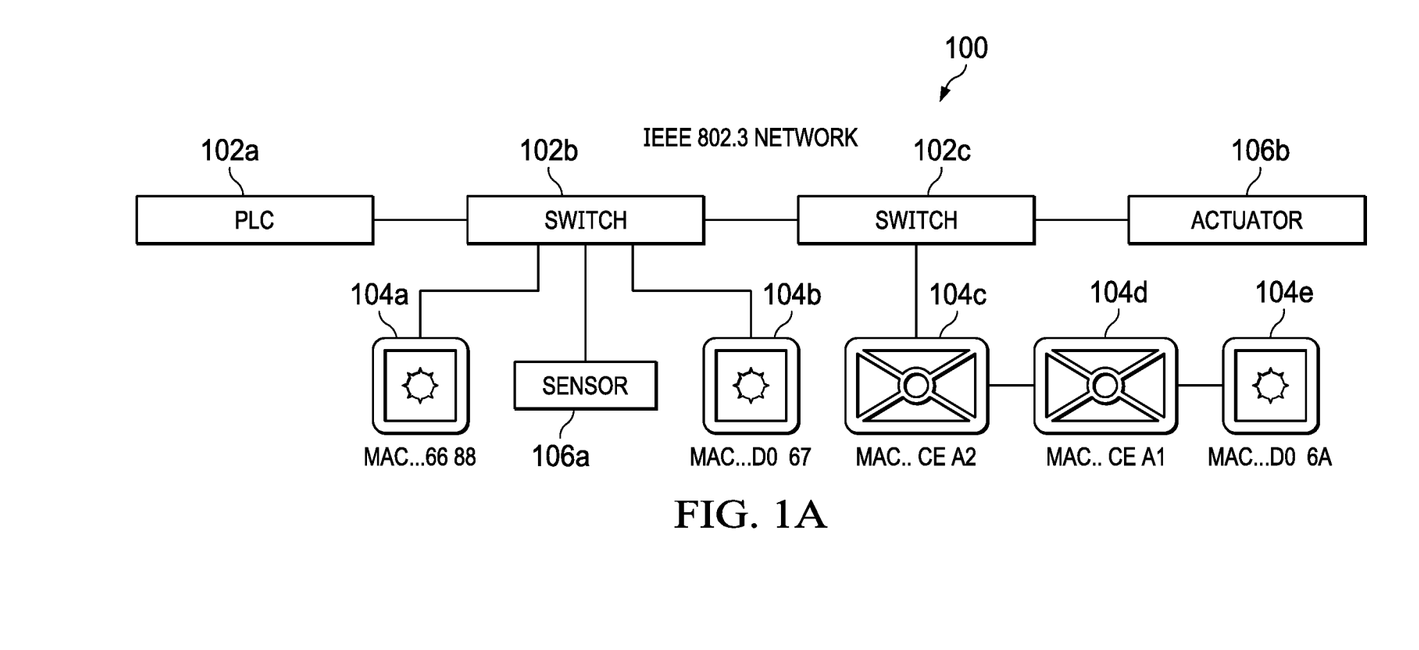
FIGS. 1A and 1B are illustrations of an illustrative network inclusive of multiple network components and nodes that may share a shared resource.
Figure 1B:
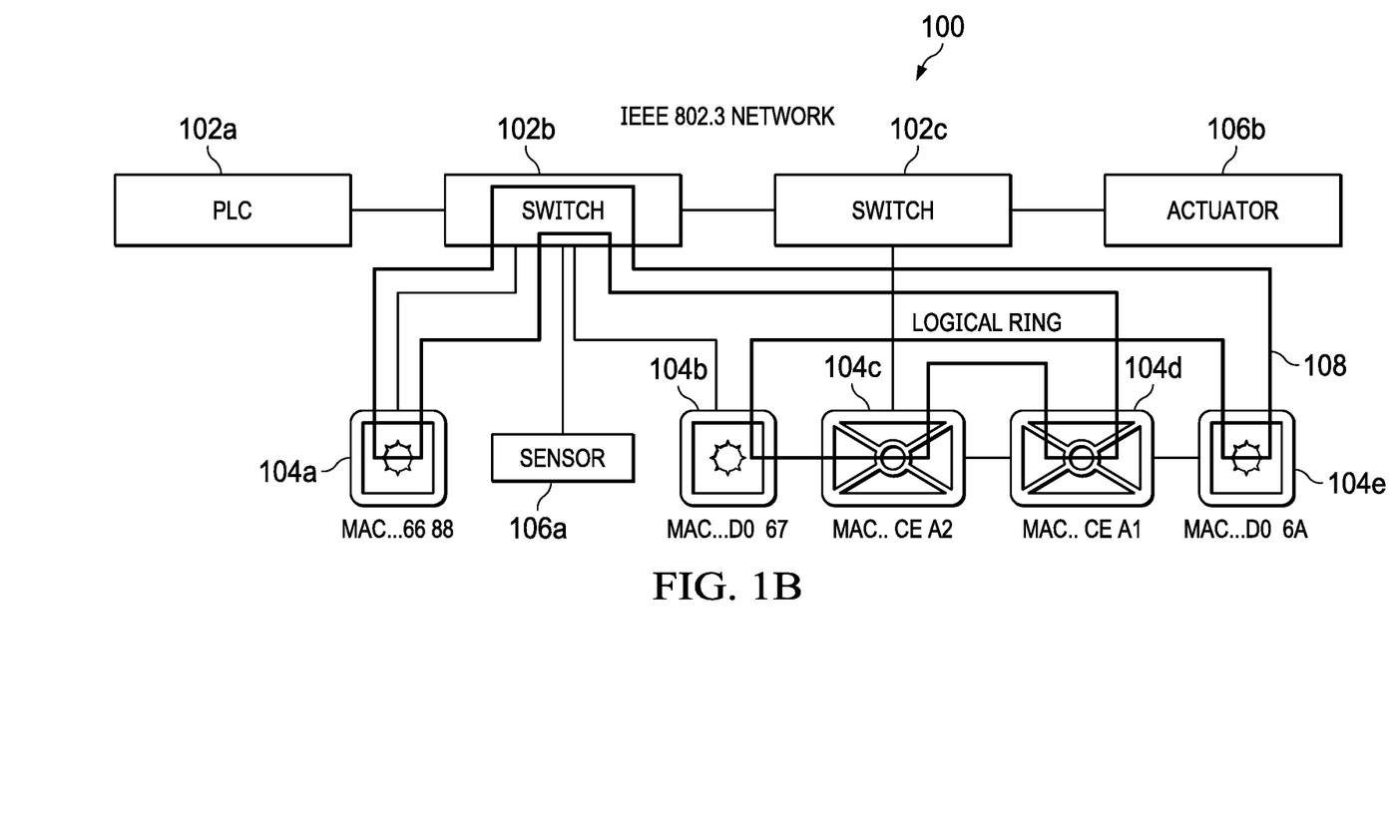

Referring now to FIGS. 1A and 1B, illustrations of an illustrative network 100 inclusive of multiple network components 102a-102c (collectively 102) and nodes 104a-104e (collectively 104) that may share a shared resource are shown. A sensor 106a and actuator 106b, which are not considered to be nodes that consume the shared resource, are also operating on the network 100. The network components 102 may include a PLC 102a and switches 102b and 102c. Other network components may be provided to support nodes 104 on the network 100. The nodes 104 may include a variety of different devices, including imaging devices 104a, 104b, and 104e, and industrial equipment 104c and 104d. As shown, each of the nodes 104 may include unique network addresses, such as MAC addresses, as understood in the art, that are used for communicating information to and from the respective nodes 104. As provided hereinbelow, the network addresses may be used for conducting operations in support of a modified token ring function, as described in a process hereinbelow with regard to FIGS. 7A and 7B. As shown in FIG. 1B, a logical ring 108 is shown to logically connect nodes 104, 104d, 104c, 104b, and 104e in a logically circular order. The nodes 104 of the logical ring 108 may be configured to consume one or more shared resource (e.g., power, bandwidth, etc.) of the network 100, for example.

To establish the logical ring 108, an illustrative process may be used to identify and configure the logical 108. The process may be performed, as follows:

Step 1

On power-on, each of the network nodes 104, such as a vision system, may present itself to each of the other nodes via a broadcast "HELLO" message. The "HELLO" message may include an associated network address so as to announce that network node to each of the other network nodes on the network 100 and to enable each of the network nodes 104 to populate a token data structure or token (UBICOMP_TOKEN) with each of the network addresses. As understood in the art, the network 100 may have any topology with any number of nodes, and is typically configured with a mixture of a star and daisy-chain topologies. As the logical ring 108 may be dynamically and logically configured, physical layout may not be used in defining an order in the token.

Step 2

In an embodiment, a number of devices, such as a reader, scanner, or other vision system, does not need to be known in advance. When the network is initially turned on, each of the nodes 104 may wait for a predetermined time (e.g., 1 second) to collect responses to each of the "HELLO" messages, after which each of the nodes 104 considers the modified token ring setup to be completed.

Additional nodes that arrive after the setup interval (e.g., 1 second) may be managed at a later time, which may be a plug-and-play approach, the same or similar to that described above (e.g., send "HELLO" message, receive responses, update token table). At this point, each of the nodes 104 may store a local copy of the same token data structure, which may be called an UBICOMP_TOKEN, to create an association between node addresses (e.g., MAC locations) in the virtual ring 108, such as, for example, (i) an increasing MAC order list, where the first entry may be the smallest, (ii) a scheduling, including which network node owns the token, (iii) number of activations, such as tokens actually used to transmit best effort traffic, and (iv) an amount of best effort data already sent by each node. A starting token is represented in an illustrative token data structure (UBICOMP_TOKEN) below in TABLE I in association with a first node having MAC address " . . . 66 88" along with a logical ring view (i.e., an ordering of the nodes 104, in this case MAC Addresses (i) . . . 66 88, (ii) . . . CE A1, (iii) . . . CE A2, (iv) . . . D0 67, (v) . . . D0 6A. It should be understood that a ring is formed by a process that after assigning a token active to a last node in the table, in this case a node with " . . . D0 6A" MAC address, that a next node to which a token active logical value is to be the first node in the table (i.e., MAC address " . . . 66 88").

TABLE I

UBICOMP_TOKEN: Initial Token
UBICOMP_TOKEN

| Global Token Activation Counter | MAC Address | Data Sent | Token Activation Counter | Token Active |
|---|---|---|---|---|
| 0 | . . . 66 88 | 0 | 0 | 1 |
|   | . . . CE A1 | 0 | 0 | 0 |
|   | . . . CE A2 | 0 | 0 | 0 |
|   | . . . D0 67 | 0 | 0 | 0 |
|   | . . . D0 6A | 0 | 0 | 0 |

Step 3

In each node, a software component, which may be called UBICOMP_ENGINE, may make the UBICOMP_TOKEN circulate between nodes in the scheduled order. In an embodiment, a scheduler may be decentralized so as to reside in each of the nodes 104, thereby preventing a token ring process from failing if the scheduler were stored in a single node that fails.

A node that has an active token may make the following actions:

1. send on the network its best-effort traffic (if any);
2. increase its TOKEN_ACTIVATION_COUNTER and DATA_SENT;
3. increase a GLOBAL_TOKEN_ACTIVATION_COUNTER;
4. reset a TOKEN_ACTIVE parameter, and set a next node's TOKEN_ACTIVE parameter; and
5. broadcast the UBICOMP_TOKEN to each of the other nodes 104 on the network, and not just to the next network node in the logical ring 108 as performed in conventional token rings.

For example, a token that is going to be sent to a fourth node may be represented as shown in TABLE II:

TABLE II

UBICOMP_TOKEN: Updated Token after 3 Nodes
UBICOMP_TOKEN

| Global Token Activation Counter | MAC Address | Data Sent | Token Activation Counter | Token Active |
|---|---|---|---|---|
| 3 | . . . 66 88 | 0.2 MB | 1 | 0 |
|   | . . . CE A1 | 10 KB | 1 | 0 |
|   | . . . CE A2 | 1 MB | 1 | 0 |
|   | . . . D0 67 | 0 | 0 | 1 |
|   | . . . D0 6A | 0 | 0 | 0 |

By sending the token to each of the nodes 104 and not just to the next scheduled node as conventionally performed, a more robust network results by avoiding the token being lost due to a node with the token being removed from the network or otherwise disabled. In an embodiment, each of the nodes 104 that receives the token may start a TIMER (e.g., a 1 second timer) that defines a maximum time slot given to the node that currently has the token active. At the end of the timer (i.e., when the timer reaches a final time that may be pre-established based on application of use, for example), a next node takes control of the token, thereby enabling that node to modify resource consumption to prevent exceeding the threshold.

In summary, a process that combines a token ring approach with a UBICOMP paradigm in order to prevent real-time performance drop of the network when multiple low-priority traffic devices, such as image readers, are running on the network may be utilized to ensure that each of the nodes on the network are able to modify consumption of a shared resource to prevent exceeding a threshold of total shared resource consumption set by a user. More specifically, in one embodiment, the processes described herein allows for multiple image readers operating as a distributed vision system to transmit (at unpredictable times) large amounts of data over a Fast Ethernet network (10/100 Mbps), such as Profinet-RT, and Ethernet/IP, without interfering significantly with the normal operations and performances of the other connected devices (e.g., PLC with various sensors and actuators). Such functionality may be achieved by logically mapping a token ring approach (TR) into a generic topology, not necessarily a loop, along with a ubiquitous computing (UBICOMP) environment, and configuring each of the nodes in the logical ring to perform token ring functionality, as further described with regard to FIGS. 7A and 7B.

Figure 2:
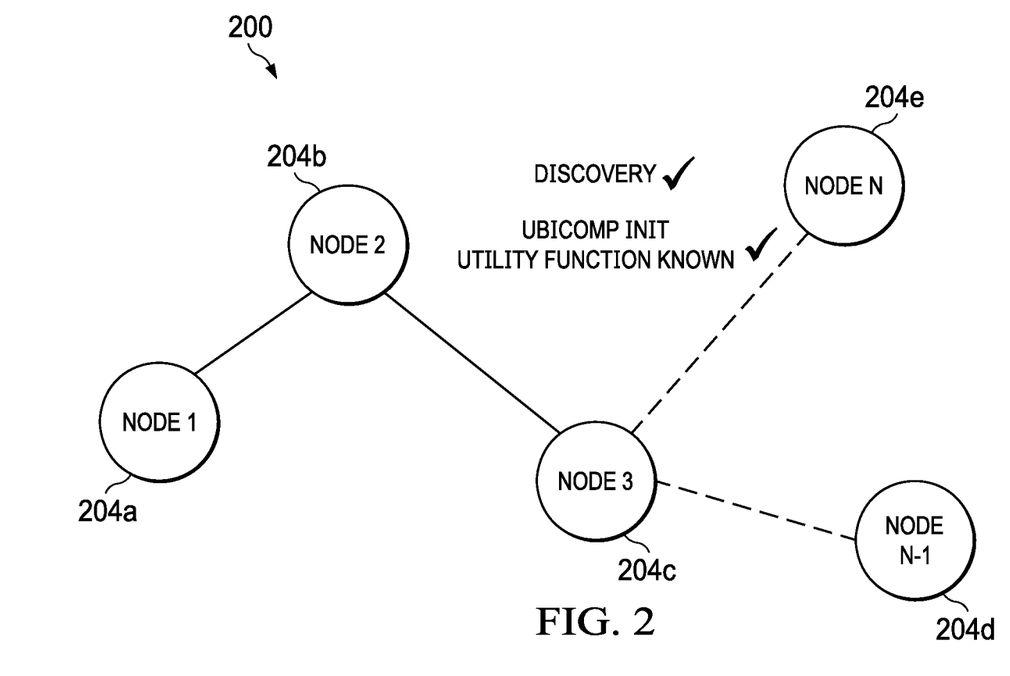
FIG. 2 is an illustration of a network schematic inclusive of multiple nodes that may share a shared resource.

Referring now to FIG. 2, an illustration of a network 200 inclusive of multiple nodes 204a-204e (collectively 204) that may share a shared resource is shown. After powering on, the network 200 may enter a discovery phase. A number of nodes N may be discovered and a logical path through the network 200, encompassing the nodes 204, may be established. The logical path may manage a variety of mass topologies. The nodes 204 may present themselves to all the other nodes via a broadcast "HELLO" message, also referred to as an identification message, which may announce a MAC address of the respective nodes 204. The "HELLO" message may operate as described hereinabove with reference to FIGS. 1A and 1B. UBICOMP engine initialization may include delivering a utility function (UF) to the nodes 204. The Utility Function of each node may be the same or different as the other nodes on the network 200.

The number of nodes on the network 200 may not need to be known in advance. In fact, as discussed hereinabove with reference to FIGS. 1A and 1B, the nodes 204 may wait for a predetermined time (e.g., 1 second) to collect all the "HELLO" messages. After the predetermined time, the nodes 204 may consider setup complete. Also discussed hereinabove with reference to FIGS. 1A and 1B, additional nodes that may arrive after the predetermined time may still be managed at a later time: the aforementioned plug-and-play approach. At the end of the discovery phase, the nodes 204 may have a local copy of a same data structure, called UBICOMP_TOKEN, which may create an association between MAC addresses in a virtual ring and additional information.

Additional notifications may be distributed to the network 200. The additional notifications may be embedded in the UBICOMP engine of the nodes 204. In one embodiment, all notifications may be broadcast to all other nodes in order to allow an external user to retrieve information regardless of which node is accessed at any time, without restrictions. In an embodiment, the nodes 204 may keep a historical log file. The historical log file may be updated upon receipt or transmission of a new notification either from the node to the network or from the network to the node. In an embodiment, the historical log file may not need to be exchanged between the nodes. Examples of relevant events that may need notification and may be extracted at any time by the user are shown in Table III below. One of ordinary skill in the art will appreciate that the notifications listed below are merely an example of potential notifications and that there may exist other notifications not listed.

TABLE III

Relevant Events of Nodes

| N | EVENT | Additional Information |
|---|---|---|
| 1 | Start Protocol | Node number (MAC address) - Time |
| 2 | Set Power | Node number (MAC address) - Power - Time |
| 3 | Enter/Exit Standby | Node number (MAC address) - Power limit value - Time |
| 4 | HW block Configured | Node number (MAC address) - Type and Value - Time |
| 5 | Stop Protocol | Node number (MAC address) - Time |

Figure 3:
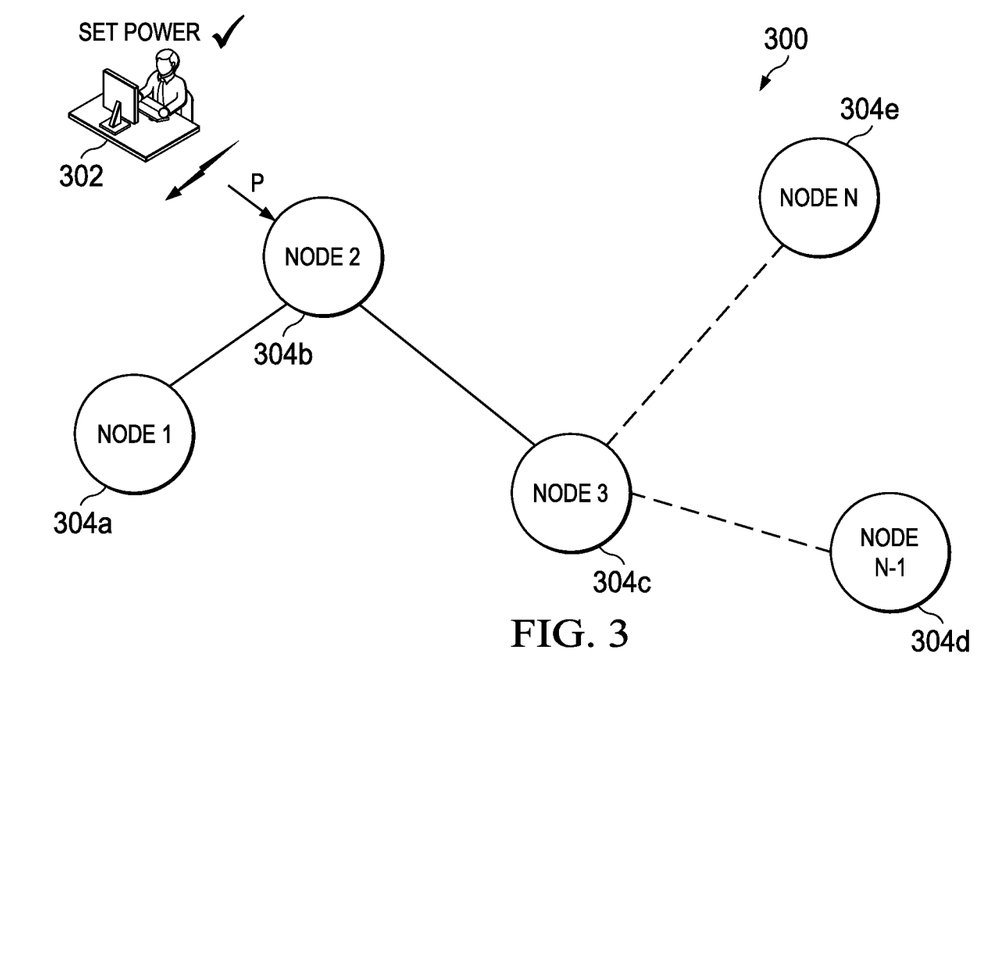
FIG. 3 is an illustration of a network inclusive of multiple nodes that may share a shared resource and inclusive of an operator who sets a share resource consumption threshold.

Referring now to FIG. 3, an illustration of a network 300 inclusive of multiple nodes 304a-304e (collectively 304) that may share a shared resource is shown. In an embodiment, at a time after the discovery phase of the network 300, as described in reference to FIG. 2, a user 302 may set up one or more parameters of the network 300. The parameter(s) of the network 300 may include a threshold resource consumption value among other parameters. The user 302 may access the network 300 via one or more of the nodes 304 or via a separate device, such as a computing device configured to communicate with nodes 304 on the network 300. The user 302 may be any of a customer, an installer, and a system integrator, among others. One of ordinary skill in the art will appreciate that the user 302 may be any person or machine that remotely accesses the network 300 via a remote location from a physical location of the network 300. The user 302 may access the network 300 at any time, such as, but not limited to, the end of the discovery phase, a beginning of a processing phase, anytime the network 300 is operational, or at an end of network 300 operations. The network 300 may be configured to function independent of the user 302 access. For example, the network 300 may continue to pass a token and modify consumption of the shared resource even while the user 302 accesses the nodes 304.

The user 302 may introduce different threshold resource consumption values throughout the network 300 operations. The user may also configure a T value, which may be a time from when the token is received by one of the nodes 304 to a time that the token is transmitted from the one of the nodes 304. The T value may serve, effectively, as a cycle time for the nodes 304 to have and modify the token before transmitting the token to another node.

One of ordinary skill in the art will appreciate that there exists a plurality of reasons that the user 302 may desire to set the threshold resource consumption value. In one embodiment, the user 302 may want to set the threshold resource consumption value, with respect to power, so that the network 300 does not exceed a network power source or to save money during peak energy costs during certain times of a day. In another embodiment, the user 302 may want to limit bandwidth of the network 300. Furthermore, one of ordinary skill in the art will also appreciate that a variety of other reasons exist that the user 302 may desire to adjust the threshold resource consumption value during operations of the network 300. In one embodiment, it may be possible for the user 302 to perform fine field-tuning of the network 300 in order to achieve a certain performance certifying a certain (optimal) resource consumption to a customer or client.

Figure 4:
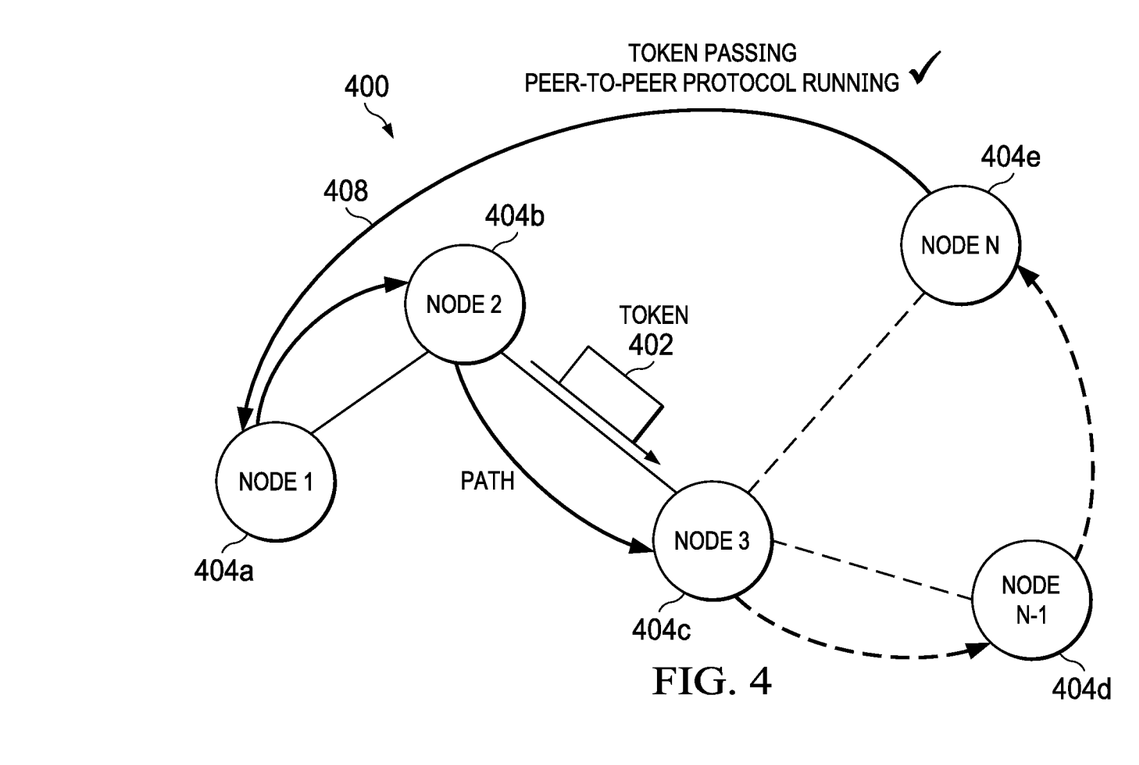
FIG. 4 is an illustration of a network inclusive of multiple nodes that may share a shared resource along with a token being passed around a logical token ring inclusive of the nodes.

Referring now to FIG. 4, an illustration of a network 400 inclusive of multiple nodes 404a-404e (collectively 404) that may share a shared resource is shown. At a time after the discovery phase of the network 400 and the initial set up by a user, a token 402 may be continuously received and transmitted among the nodes 404. The token 402 may include data that forms a token payload. The token payload is further discussed herein below in reference to FIG. 6. The token 402 may be a unique message token with a certain data searcher that may be repeatedly passed among the nodes 404 through a path 408, such as the virtual loop 108 of FIGS. 1A and 1B. The path 408 may be defined or established in the discovery phase and/or in response to new nodes joining the network 400. One of ordinary skill in the art will appreciate that a makeup of the path 408 may serve multiple functions. For example, the path 408 may be configured to perform real-time monitoring of resource consumption and to deliver relevant data (e.g., current shared resource usage) between the nodes 404.

The path 408 may represent a logical token ring network. However, one of ordinary skill in the art will appreciate that a variety of local area networks exist that may serve a similar function as the token ring network (e.g. IEEE 802.3 Ethernet). The makeup of the path 408 does not affect the ability of the network 402 to manage the shared resource. A logical token ring network may help prevent mixing or collision of data between the nodes 404. In one embodiment, the network 404 may include two or more tokens. For example, a first token may be used to manage power consumption by the network 400, and a second token may be used to manage bandwidth consumption of the network 400. The nodes 404 may be configured to handle receipt of two or more tokens within a time less than a designated T value, and to perform shared resource processing, as further described herein.

Figure 5:
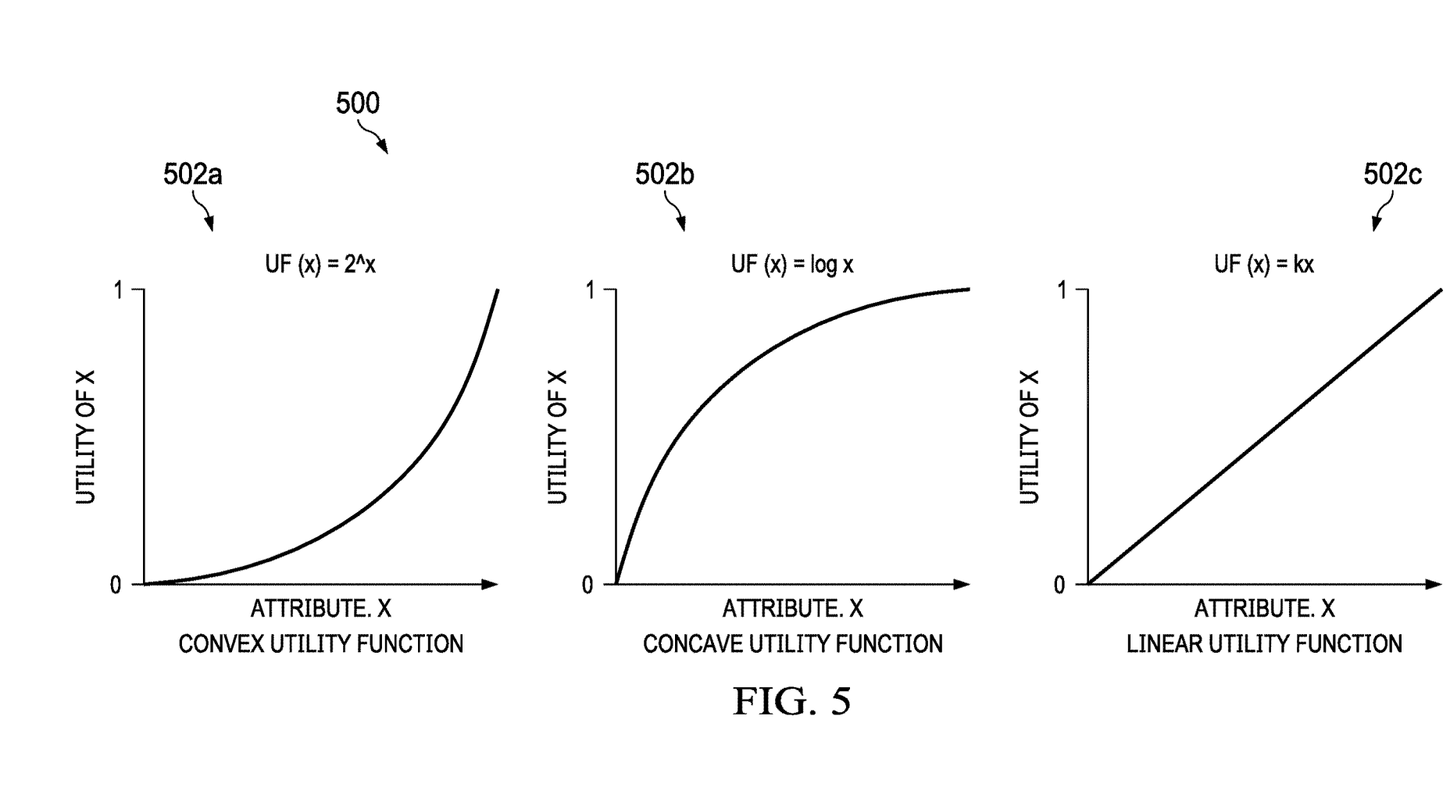
FIG. 5 is a graphical representation of different utility functions that may be applied to a network for managing a shared resource.

Referring now to FIG. 5, a set of graphs 500 of different utility functions 502a-502c (collectively utility functions 502) that may be applied to a network of nodes is shown. The utility functions 502 may represent one embodiment of decision theory, which is a category of game theory. The utility functions 502 may represent satisfaction experienced by a user with a certain resource by measuring its utility in economic terms. The utility functions 502 may be viewed as monotonic functions that map resource quantity to their utility. The resource quantity may be referred to as "attributes." The utility functions 502 may represent a small selection of available utility functions.

The nodes of the network may include and execute the same or different utility functions from the other nodes. In some embodiments, a node may include and execute multiple utility functions. The multiple utility functions may be combined to form a more sophisticated utility function. The more sophisticated utility function may be designed by linear combination of at least two attributes by assigning each attribute to a utility function and subsequently assigning a weight to each utility function. An example of a sophisticated utility function is represented below in Equation 1.

$$UF(x_1, \ldots, x_n) = k_1 UF(x_1) + \ldots + k_n UF(x_n) \quad \text{Equation 1}$$

K of each utility function may represent the weight that is applied to the utility function. The weight of the utility function may be set by the user or may be measured by a regulator and assigned by a processor. The weight of each utility function may vary throughout the operations of the network. In one embodiment, it is not necessary for the nodes to know the utility functions of the other nodes. In an embodiment, the utility functions 502 may be related to key performance indicators, such as, but not limited to, read rate, redundancy reading condition detection, and so on. In the event that multiple shared resources are being managed, different utility functions may be used to manage the different resource being consumed by the nodes.

Different utility functions may represent different network management desires of the user. For example, a convex utility function 502a may represent a risk-seeking scenario, while a concave utility function 502b may represent a risk-averse scenario. A linear utility function 502c may represent a risk neutral scenario. As described above, utility functions may be used to support a game theory element in the network. Game theory may provide various network management scenarios, such as, but not limited to, zero-sum applications and/or other behavioral relationships. In one embodiment, the zero-sum relationship indicates that as one element increases a parameter by a value, another element decreases the parameter by the same value. One of ordinary skill in the art will appreciate that a zero-sum relationship may benefit a scenario involving a shared resource. However, one of ordinary skill in the art will also appreciate that a zero-sum relationship may not be required. If, for example, a maximum power and/or bandwidth threshold value is set by a user managing the network, then the utility functions may be used by the nodes of the network in an attempt to minimize or otherwise maintain overall shared resource below the maximum power and/or bandwidth threshold value.

Figure 6:
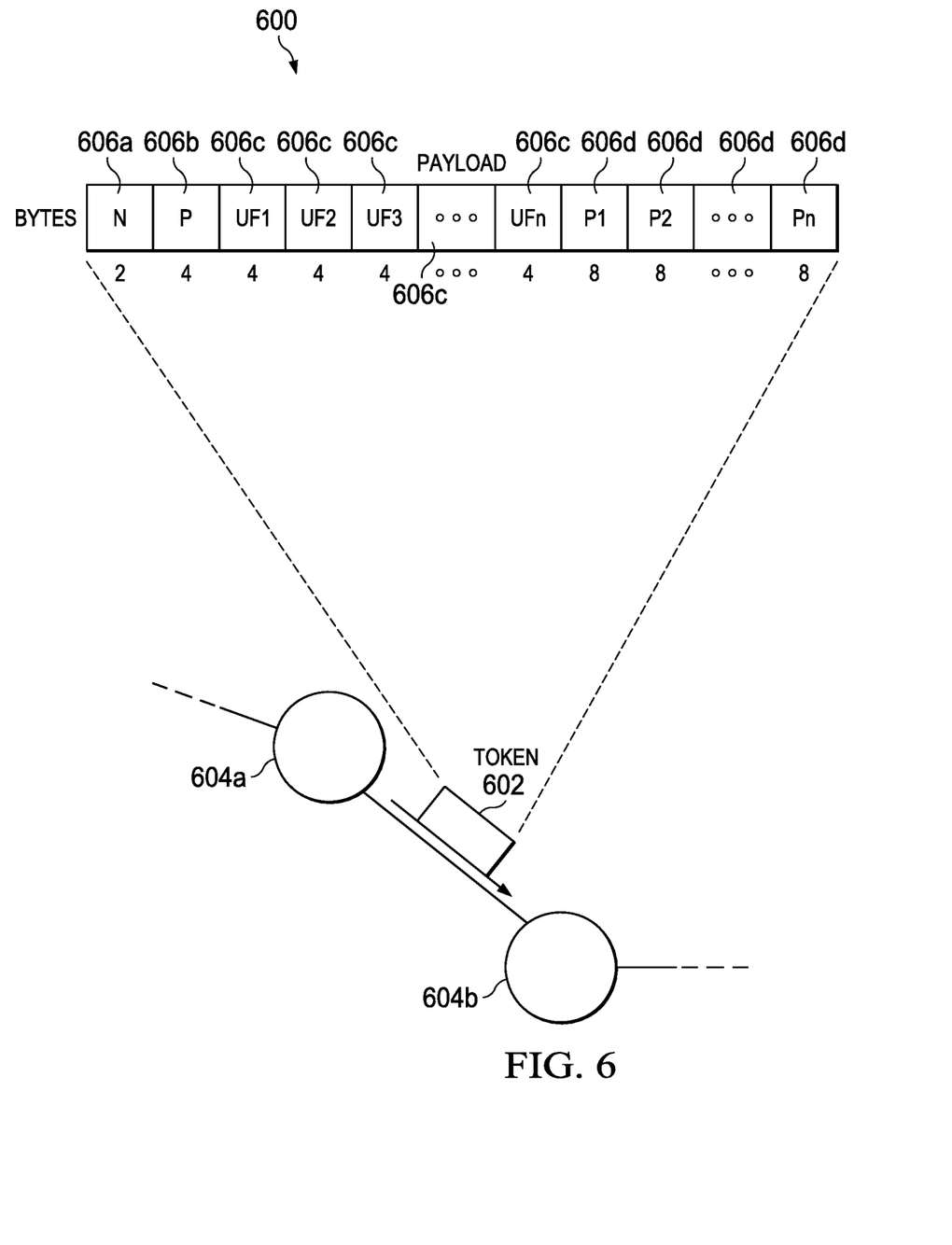
FIG. 6 is an illustration of a token payload of a token traveling among nodes and having a plurality of data points or computational data.

Referring now to FIG. 6, an illustration of a token payload 600 of a token 602 traveling among nodes 604a-604b (collectively 604) including data points 606a-606d (collectively 606) is shown. The token 602 may be received by the nodes 604, and in response, the nodes 604 may evaluate or execute their respective resource consumption and utility function. The nodes 604 may then compare the evaluation or results with data points 606 to the token 602 received by a different node. The nodes 604 may then compute a resource delta value that represents a difference from the threshold resource consumption value set by the user with an actual resource consumption value measured by the collective nodes 604. The nodes 604 may determine that resource consumption is to be adjusted, either upward or downward, based on the threshold resource consumption value, the actual resource consumption value, and the utility functions. The nodes 604 may adjust consumption of the resource by internal components of the nodes 604. The nodes 604 may handle resource consumption by internal components in any designated method, such as, but not limited to, shutting down non-vital internal components. Handling of resource consumption is further described hereinbelow in reference to FIGS. 7A and 7B.

In one embodiment, the token payload 600 may include a total number of nodes 606a, a threshold resource consumption value 606b, actual values of utility functions for every node on the network 606c, and an actual value of average resource consumption for every node on the network 606d. One of ordinary skill in the art will appreciate that the data points 606 may include any data for computing resource consumption and an adjustment of the resource consumption by the nodes 604.

Figure 7A:
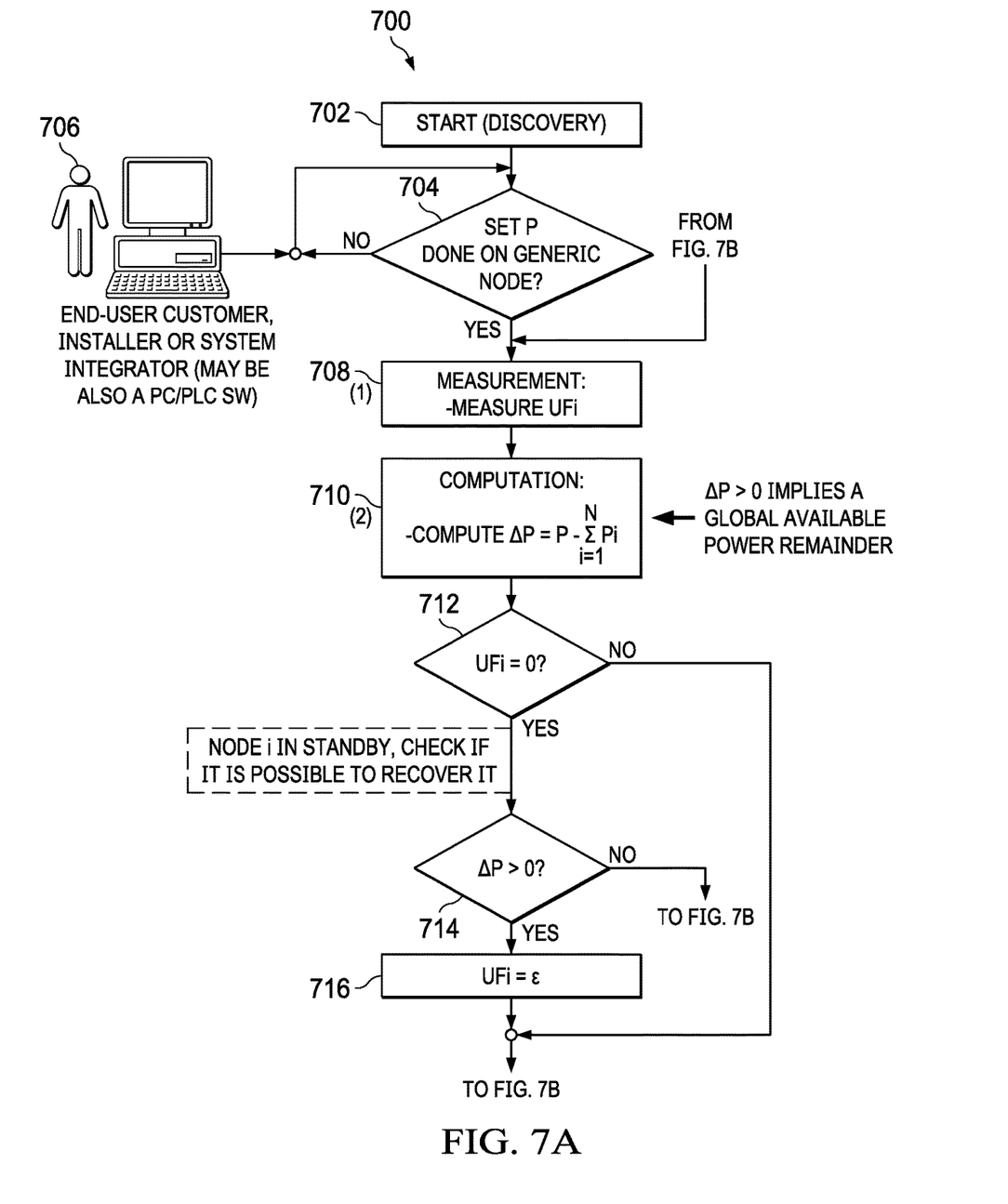
FIGS. 7A and 7B are a flowchart of a method for managing a shared resource.
Figure 7B:
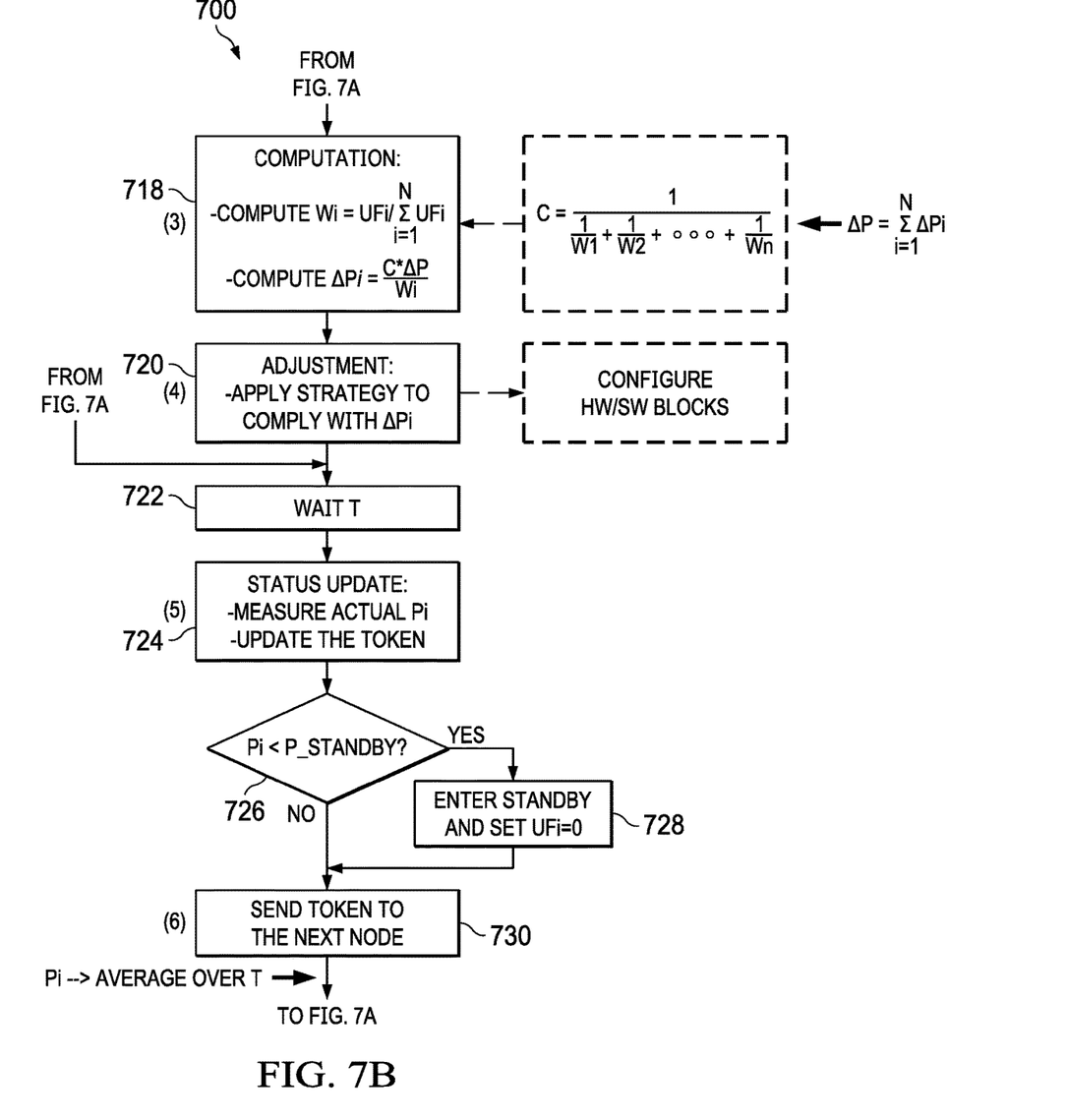

Referring now to FIGS. 7A and 7B, a flowchart of a method 700 for managing a shared resource is shown. At step 707, a discovery phase may be performed as described hereinabove with reference to FIG. 2. At step 704, a setup phase 704 may include a user 706 accessing a node on a network to set up parameters, such as shared resources, of the network as described hereinabove with reference to FIG. 3.

In response to the node receiving a token, the node may begin a process of managing the shared resource. At step 708, the node may measure its actual utility, UFi. The node may compute a delta resource consumption value of the network at step 710 by comparing an actual resource consumption value with a threshold resource consumption value. The threshold resource consumption value may be initially set by the user 706 at the setup phase at step 704. However, the user 706 may access the network at any time and on any node, and modify the threshold resource consumption value. In response to receipt of the token by the accessed node, the threshold resource consumption value may be adjusted in the token and future delta resource consumption values may be computed according to the modified threshold resource consumption value.

In an embodiment, the node may include a minimum resource threshold below which the node may be unable to operate. Upon falling below the minimum resource threshold, the node may enter a standby state. Nodes in the standby state may set their actual utility to zero, UFi=0. However, nodes in the standby state may also continue to update the token with their actual utility and upon rising back above the minimum resource threshold, may reenter the network as an online node. In an embodiment, the node may be configured to not drop below a minimum resource threshold. The node may be configured to check to see the minimum resource threshold 712 has been crossed. In a condition that the node has fallen below the minimum resource threshold at step 712, the node may enter a standby state, and continue to measure its resource consumption at step 714. If the node measures resource consumption above the minimum resource threshold at step 712, the node may measure actual utility relative to the resource and update the token at step 716. After updating the token at step 716, the node may return to the process of managing the shared resource. At step 722, if the node continues to measure resource consumption below the minimum resource threshold, the node may move to waiting for a time equal to a T value, the T value being set by the user 706.

In a condition that the node has not fallen below the minimum resource threshold as determined at step 712, the node may proceed to computing a resource consumption adjustment at step 718. First, a weight, Wi, may be calculated by dividing the actual utility of the node by a sum of actual utilities of the other nodes in the network. A scaling factor, C, may also be calculated by dividing 1 by a sum of inverses of the weights of the nodes on the network. An amount of resource consumption adjustment may be computed by multiplying the scaling factor and the delta resource consumption value, and then dividing that value, by the calculated weight of the utility function of the node.

The node may make adjustments and resource consumption 720 according to the resource consumption adjustment calculated by computing the resource adjustment 718. One of ordinary skill in the art will appreciate that adjustments to resource consumption may occur in a number of ways, such as, but not limited to, limiting access to the shared resource by internal hardware or software components of the node. Each node may include a different internal strategy for adjusting resource consumption to the other nodes on the network. The internal strategy of each node may not need to be known by the other nodes on the network. In one embodiment, the shared resource is power and the internal strategy may include switching on or off, or regulating, the internal hardware components of the node.

After a time equal to the T value, actual resource consumption of the node may be measured and used to update the token at step 724. If a determination is made that the updated actual resource consumption of the node has fallen below the minimum resource threshold at 726, the node may enter the standby state and set the actual utility to zero at step 728. Upon completion of entering the standby state and updating the actual utility of the node on the token, or upon determining that the actual resource consumption of the node remains above the minimum resource threshold, the node may transmit the token to a next node, where the next node may measure its actual utility at step 708.

In some embodiments, the delta resource consumption value may be a negative value or a positive value. In the case of a positive delta resource consumption value, extra resource may be distributed, or redistributed, among the other nodes of the network. In one embodiment, the extra resource may be delivered to lesser performing nodes. One of ordinary skill in the art will appreciate that there may be a number of management options for the node in the standby state. In one embodiment, the T value may be set by the user 706. In another embodiment, the T value may be chosen by a manufacturer of the node.

Figure 8:
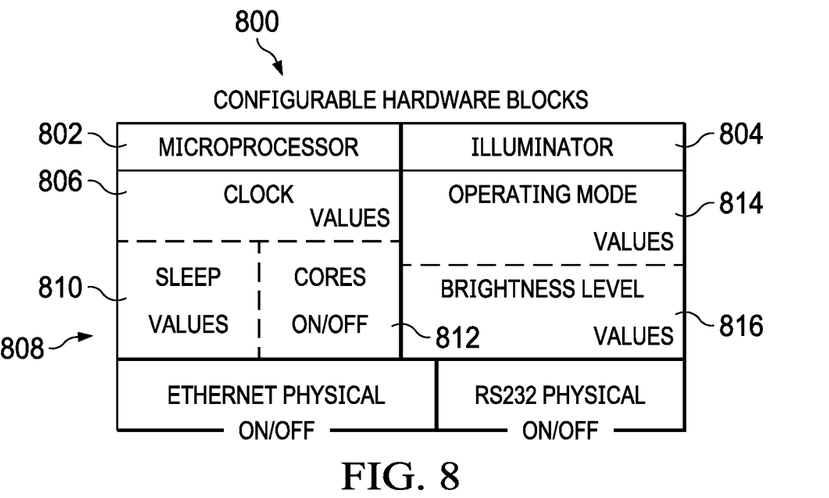
FIG. 8 is a schematic of configurable hardware blocks of a node.

Referring now to FIG. 8, a schematic of illustrative hardware blocks 800 of a node is shown. As described hereinabove, the node may measure its actual resource consumption value. In one embodiment, the node may include a microprocessor 802 and illuminator 804 (if a scanning device). Other devices, such as industrial machining equipment may include other physical components. The hardware blocks 800 may further include a clock 806, and memory 808 in which a sleep parameter 810, core-number parameter 812, operating node parameter 814, and brightness level parameter 816 may be stored and accessed by the microprocessor 802 to adjust power consumption, for example. The microprocessor 802 may be configured to measure the actual resource consumption value through the use of hardware components such as, but not limited to, current sensors and voltage sensors placed throughout the node while in possession of a token or otherwise.

More specifically, the node may include an internal list of the hardware blocks 800 and associated actions that may be taken to adjust resource consumption via each block of the hardware blocks 800. Depending on an assigned resource level, the node may apply an individual strategy to adjust the resource consumption by the node in order to comply with the threshold resource consumption value. In one embodiment, the node may begin managing resource consumption at blocks that demand less of the resource. As an example, the node may adjust the brightness level parameter 810 to reduce brightness of the illuminator 804 thereby reducing power consumption by the node. In another embodiment, the node may begin managing resource consumption at blocks that are less vital to operation of the node.

The actual utility for the node may be computed after resource consumption by the node has been adjusted. In one embodiment, internal strategies of the node may be applied just once per time equal to the T value, even if applying the internal strategies once is insufficient to reach the threshold resource consumption value.

Figure 9:
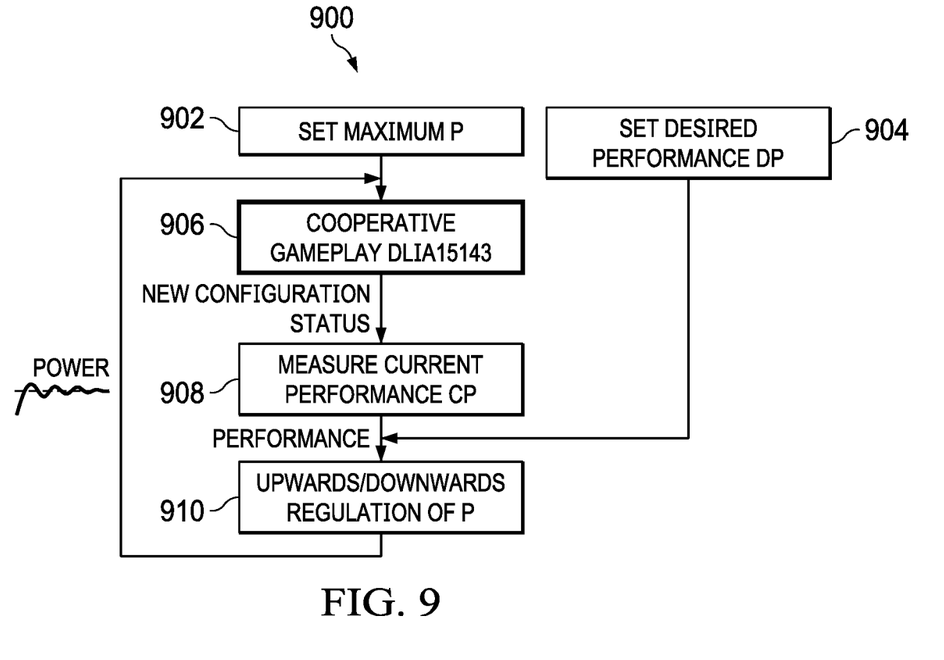
FIG. 9 is a flowchart of a method of managing resource consumption to maximize performance of a network.

Referring now to FIG. 9, a flowchart of a process 900 of managing resource consumption to maximize performance is shown. The performance may relate to configurable parameters such as, but not limited to, read rate, reading redundancy degree from the cluster, bandwidth capacity, power usage, and many others. In one embodiment, a user may set a threshold resource consumption value for a network at step 902, such as the network described hereinabove. The user may also set a desired performance value at step 904.

After an initial set up, the network may enter a performance phase. At step 906, a cooperative gameplay process may be performed where the cooperative gameplay process may include establishing and updating parameters in a token that is passed around a logical token, as previously described. A new configuration status may result from the cooperative gameplay at step 906. Current performance node(s) of the token ring may be measured at step 908. The current performance may be evaluated at step 910 in light of the desired performance and/or new configuration status and an upward or downward adjustment may be applied at nodes(s) having a token, for example. The current performance may be based on output data from the performance phase of step 906. In one embodiment, to avoid entering into local maximum or minimum thresholds of performance, monotonicity of the resource compared to performance may be guaranteed. The process 900 may repeat back at step 906 to regulate the performance parameter(s) by the nodes of the network.

Figure 10:
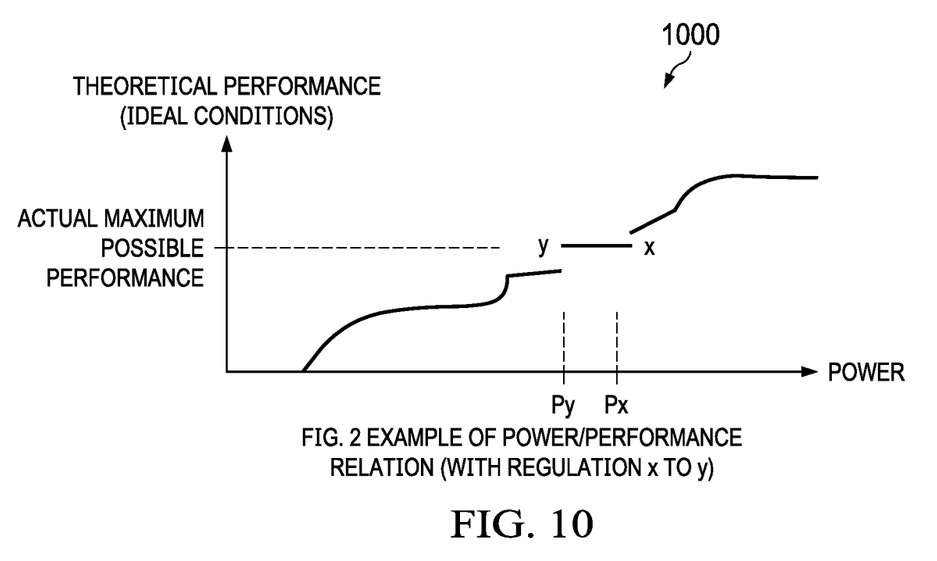
FIG. 10 is a graph showing a relation between resource consumption and performance.

Referring now to FIG. 10, a graph showing measured power 1000 of a node, which is a resource being regulated, is shown. One of ordinary skill in the art will appreciate that alternative resources measured by performance and consumption may be regulated, as well. As shown, actual maximum possible performance is shown on the Y-axis and a current measured resource (power) may be adjusted to lower power, but maintain performance. In one embodiment, a down regulation of a current resource from a value Px to a value Py and a plateau may be reported.

In one embodiment, it may be convenient to apply a proposed method at a higher plant level in a distribution or sorting facility. It may be easier to achieve a best possible resource consumption threshold for a certain performance due to selectively controlling subparts of individual working units, which may result in entire sorting lines being activated or idled as needed. The activation or idling may depend on at least one of a number of incoming items for processing, deadlines for completion of processing, and a capacity of queuing areas, which may all be related, even in a complex or unpredictable way, to an overall performance and resource consumption of the line.

In another embodiment, battery-powered devices may be present in the network. The methods described hereinabove may automatically reduce performance when a defined threshold is reached for a residual battery in order to extend a partially operated state of an associated device.

In an embodiment, a process for managing a shared resource in a network including nodes may include, in response to joining the network, broadcasting, by a node, an identification message, and receiving, by the node, a token data structure including computational data including a threshold total resource consumption value of the plurality of nodes, current resource consumption values of respective nodes, and current utility function values of the respective nodes, the computational data being used to adjust consumption of the shared resource by the node.

In some embodiments, the method may further include adjusting, by the node, consumption of the shared resource by the node. The adjusting may include evaluating performance of the node by comparing a utility function of the node with utility functions of the other nodes with computational data included in the data structure. A current resource consumption of the node may be measured. A determination of an actual resource consumption value of the nodes may be made by combining a measured current resource consumption value of the node with stored resource consumption data of the other nodes that is read from the token data structure. The actual resource consumption value may be compared to the threshold total resource consumption value to create a delta resource consumption value being a difference between the actual resource consumption value and the threshold total resource consumption value read from the token data structure. Resource consumption of the node may be adjusted according to the utility function of the node. A new resource consumption value of the node may be written to the token data structure, where the writing may include replacing the stored resource consumption data of the node on the token data structure. The token data structure may be transmitted to a second node.

In another embodiment, the method further includes entering a standby state, by the node, when the measured current resource consumption value of the node falls below a minimum threshold required to operate the node, wherein entering the standby state may include writing a value of zero for the utility function of the node to the token data structure.

In another embodiment, the method further includes updating, by the node, the token data structure while in the standby state.

In another embodiment, adjusting the resource consumption of the node includes applying a weight to determine an amount of resource consumption adjustment. Adjusting the resource consumption of the node may include regulating at least one of multiple components of the node.

In another embodiment, adjusting consumption of the shared resource by the node is configured to occur within a designated amount of time. Adjusting the resource consumption may include adjusting the resource consumption by the node once during the designated amount of time.

In another embodiment, the method further includes waiting for a first predetermined time in which the nodes are broadcasting the identification message, where conclusion of the first predetermined time signals an end to setup time.

In another embodiment, the method further includes queuing any additional nodes that broadcast the identification message after the conclusion of the predetermined time to be added to the nodes at a second predetermined time.

In another embodiment, the method further includes adjusting the threshold resource consumption value.

In another embodiment, a node includes an input/output (I/O) unit and a processing unit in electronic communication with the I/O unit. The processing unit may be configured to broadcast an identification message inclusive of an address, receive a token data structure including data, measure consumption of a shared resource to find a measured consumption, and adjust consumption of the shared resource using the data and the measured consumption.

In another embodiment, the processing unit adjusting consumption of the shared resource is based on the measured consumption being different than a target consumption of the shared resource.

In another embodiment, the processing unit is further configured to write a new shared resource consumption value specific to the node to the token data structure and indicate to the I/O unit that the token data structure is ready for transmittal, the I/O unit being configured to transmit the token data structure in response to the processing unit.

In another embodiment, the processing unit indicates to the I/O unit that the token data structure is ready for transmittal at a conclusion of a period of time, the period of time initiated by receiving the token data structure.

In another embodiment, the shared resource is at least one of power and bandwidth.

In another embodiment, the processing unit is further configured to transition the node in a standby state in response to the measured consumption of the shared resource by the node reaching a predetermined threshold.

In another embodiment, the processing unit is further configured to receive at least two token data structures inclusive of different shared resources being managed by the nodes.

In another embodiment, the processing unit being configured to adjust the resource consumption includes at least one of increasing resource consumption and decreasing resource consumption The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. A method for managing a shared resource in a network including a plurality of nodes, the method comprising:
   in response to joining the network, broadcasting, by a node, an identification message to the network;
   receiving, by the node, a token data structure including computational data including a threshold resource consumption value of the plurality of nodes, current resource consumption values of respective nodes, and current utility function values of the respective nodes, the computational data being used to adjust consumption of the shared resource by the node;
   adjusting, by the node, consumption of the shared resource by the node based, at least in part, on current resource consumption values being different than the threshold total resource consumption value; and
   adjusting the consumption of the shared resource with additional nodes on the network, at least two of the additional nodes having different internal strategies for adjusting the consumption.

2. A method for managing a shared resource in a network including a plurality of nodes, the method comprising:
   in response to joining the network, broadcasting, by a node, an identification message to the network;

receiving, by the node, a token data structure including computational data including a threshold total resource consumption value of the plurality of nodes, current resource consumption values of respective nodes, and current utility function values of the respective nodes, the computational data being used to adjust consumption of the shared resource by the node; and adjusting, by the node, consumption of the shared resource by the node, the adjusting including:

evaluating performance of the node by comparing a utility function of the node with utility functions of the other nodes with computational data included in the data structure;

measuring a current resource consumption of the node;

determining an actual resource consumption value of the nodes by combining a measured current resource consumption value of the node with stored resource consumption data of the other nodes that is read from the token data structure;

comparing the actual resource consumption value to the threshold total resource consumption value to create a delta resource consumption value being a difference between the actual resource consumption value and the threshold total resource consumption value read from the token data structure;

adjusting resource consumption of the node according to the utility function of the node;

writing a new resource consumption value of the node to the token data structure, the writing including replacing the stored resource consumption data of the node on the token data structure; and transmitting the token data structure to a second node.

3. The method according to claim 2, further comprising entering a standby state, by the node, when the measured current resource consumption value of the node falls below a minimum threshold required to operate the node, and wherein entering the standby state includes writing a value of zero for the utility function of the node to the token data structure.

4. The method according to claim 3, further comprising updating, by the node, the token data structure while in the standby state.

5. The method according to claim 2, wherein adjusting the resource consumption of the node includes applying a weight to determine an amount of resource consumption adjustment.

6. The method according to claim 2, wherein adjusting the resource consumption of the node includes regulating at least one of a plurality of components of the node.

7. The method according to claim 2, wherein adjusting consumption of the shared resource by the node is configured to occur within a designated amount of time.

8. The method according to claim 7, wherein adjusting the resource consumption includes adjusting the resource consumption by the node once during the designated amount of time.

9. The method according to claim 1, further comprising waiting for a first predetermined time in which the nodes are broadcasting the identification message, wherein a conclusion of the first predetermined time signals an end to setup time.

10. The method according to claim 9, further comprising queuing any additional nodes that broadcast the identification message, the conclusion of the predetermined time to be added to the nodes at a second predetermined time.

11. The method according to claim 1, further comprising adjusting the threshold resource consumption value during operation of the network.

12. A node comprising:
an input/output (I/O) electronics;
a non-transitory computer readable storage medium having instructions stored thereon; and
a processor in electronic communication with the I/O electronics, wherein the instructions, when executed, cause the processor to:
broadcast an identification message inclusive of an address;
receive a token data structure including data;
measure consumption of a shared resource to find a measured consumption;
adjust consumption of the shared resource using the data and the measured consumption based, at least in part, on the measured consumption being different than a target consumption of the shared resource; and
adjust the consumption of the shared resource with additional nodes on the network, at least two of the additional nodes having different internal strategies for adjusting the consumption.

13. A node comprising:
input/output (I/O) electronics;
a non-transitory computer readable storage medium having instructions stored thereon; and
a processor in electronic communication with the I/O electronics, wherein the instructions, when executed, cause the processor to:
broadcast an identification message inclusive of an address;
receive a token data structure including data;
measure consumption of a shared resource to find a measured consumption;
adjust consumption of the shared resource using the data and the measured consumption;
write a new shared resource consumption value specific to the node to the token data structure;
indicate to the I/O electronics that the token data structure is ready for transmittal, the I/O electronics being configured to transmit the token data structure in response to the processor; and
indicate to the I/O unit that the token data structure is ready for transmittal at a conclusion of a period of time, the period of time initiated by receiving the token data structure.

14. The node of claim 12, wherein the shared resource is at least one of power or bandwidth.

15. The node of claim 12, wherein the instructions, when executed, further cause the processor to transition the node in a standby state in response to the measured consumption of the shared resource by the node reaching a predetermined threshold.

16. The node of claim 12, wherein the instructions, when executed, further cause the processor to receive at least two token data structures inclusive of different shared resources being managed by the nodes.

17. The node of claim 12, wherein instructions, when executed, cause the processor to adjust the resource consumption by at least one of increasing resource consumption or decreasing resource consumption.

* * * * *